United States Patent
Lim et al.

(10) Patent No.: US 7,962,670 B2
(45) Date of Patent: Jun. 14, 2011

(54) PIN MULTIPLEXING

(75) Inventors: Alvin Lim, Singapore (SG);
Balakrishnan Kangol, Karnataka (IN);
Sreekumar Padmanabhan, Karnataka (IN); Sachin Mathur, Karnataka (IN)

(73) Assignee: Lantiq Deutschland GmbH, Neubiberg (DE)

( * ) Notice: Subject to any disclaimer, the term of this patent is extended or adjusted under 35 U.S.C. 154(b) by 581 days.

(21) Appl. No.: 11/759,031

(22) Filed: Jun. 6, 2007

(65) Prior Publication Data

US 2008/0304351 A1 Dec. 11, 2008

(51) Int. Cl.
*G06F 3/00* (2006.01)
*G06F 5/00* (2006.01)
(52) U.S. Cl. ............... 710/36; 710/38; 710/51; 710/58
(58) Field of Classification Search ............ 710/36, 710/38, 51, 58
See application file for complete search history.

(56) References Cited

U.S. PATENT DOCUMENTS

| | | | |
|---|---|---|---|
| 6,230,263 B1 * | 5/2001 | Ryan et al. | 712/245 |
| 6,247,088 B1 * | 6/2001 | Seo et al. | 710/305 |
| 7,199,607 B2 * | 4/2007 | Volkening et al. | 326/38 |
| 2005/0050283 A1 * | 3/2005 | Miller et al. | 711/150 |
| 2006/0132178 A1 | 6/2006 | Volkening et al. | |
| 2007/0220352 A1 * | 9/2007 | Hernandez et al. | 714/39 |

* cited by examiner

*Primary Examiner* — Alford W Kindred
*Assistant Examiner* — Zachary K Huson
(74) *Attorney, Agent, or Firm* — Slater & Matsil, L.L.P.

(57) ABSTRACT

A semiconductor device coupled to input/output pins includes a first core to operate a first function and a second core to operate a second function. A multiplexer is arranged to set the input/output pins to the first function or to the second function, and an arbiter is configured to receive requests from the cores to use the input/output pins and to grant use of the input/output pins to a selected core. A register is arranged to store a value indicative of a delay to be applied by the arbiter when granting use of the input/output pins to the second core.

19 Claims, 3 Drawing Sheets

PIN MULTIPLEXING

BACKGROUND

An embodiment of the invention relates to pin multiplexing across a plurality of I/O (input/output) pins.

TECHNICAL FIELD

Pin multiplexing techniques are frequently used for I/O bus interfaces connecting to external devices, because pin resources of integrated circuit packages are usually limited. In pin multiplexing, the multiplexed interface is switched from one function to another function dynamically, governed by the system's access needs. However, differences in the access time of the interfaced external devices are not always considered. This may result in I/O bus contention when the multiplexed interface switches from one external device to another external device.

Bus contention is sometimes countered by buffering the outputs of the external devices. Another possibility is to force one or more of the external devices to run at a lower frequency. These measures, however, may reduce overall system performance.

BRIEF DESCRIPTION OF THE DRAWINGS

Aspects of the invention are made more evident by way of example in the following detailed description of embodiments when read in conjunction with the attached drawing figures, wherein.

DETAILED DESCRIPTION OF ILLUSTRATIVE EMBODIMENTS

As it is known in the art, I/O buses connect cores of a semiconductor device to multiple external (i.e., off-chip) devices, among them memory devices such as flash type memory devices and SDRAM (Synchronous Dynamic Random Access Memory) devices. In the following, it is assumed that an I/O bus may have multiple masters, i.e., that at least two external devices connected to the I/O bus may each initiate an I/O bus data transfer. In multiple master I/O buses, an arbiter is used to coordinate the access to and control of the I/O bus. Further, the I/O bus may be driven in an asynchronous mode when each master applies a different clocking rate to the bus.

Figure 1:
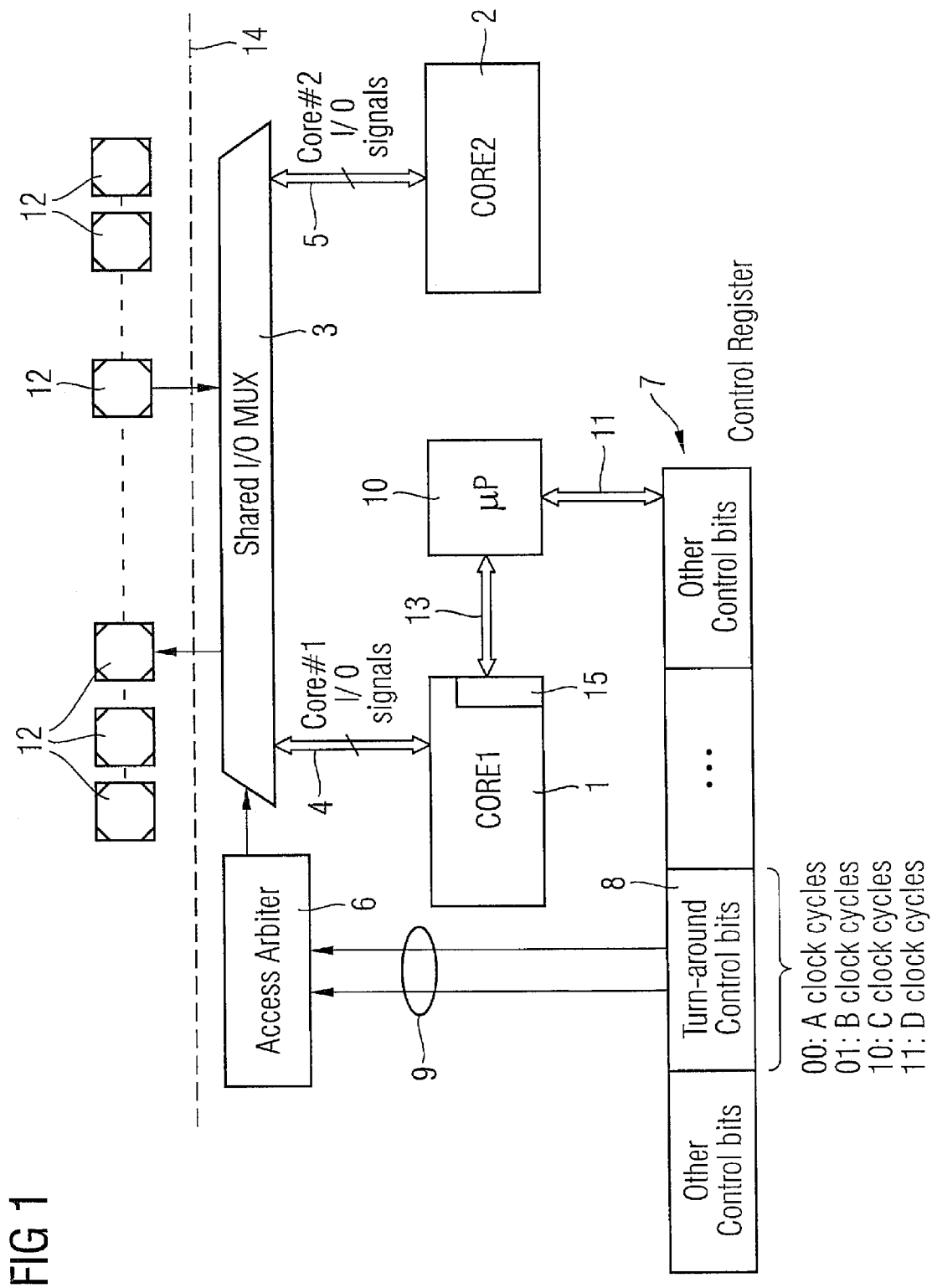
FIG. 1 illustrates a schematic diagram of a pin multiplexing semiconductor device according to an embodiment.

FIG. 1 shows a semiconductor device for pin multiplexing. The semiconductor device comprises a first core 1 and a second core 2, each coupled to a shared I/O multiplexer 3 via bi-directional data links 4 and 5, respectively. Data link 4 transfers I/O signals associated with the first core 1 and data link 5 transfers I/O signals associated with the second core 2. The semiconductor device further comprises an arbiter 6 and a control register 7. The control register 7 comprises a delay time memory field 8.

The delay time memory field 8 may be accessed directly via an n-bit data connection 9 by the arbiter 6. In the delay time memory field 8, a number of n so-called turn-around control bits are stored. For instance, as depicted in FIG. 1, n may be 2. In this case, the delay time memory field 8 accommodates two memory bit cells, in which bit pairs 00, 01, 10 and 11 can be stored. Besides the delay time memory field 8, the control register 7 may accommodate additional memory fields for other I/O bus control bits.

The delay time memory field 8 may also be implemented in the arbiter 6. Further, it may or may not be part of a subordinate control register 7. In the following, the delay time memory field 8 is therefore generally referred to as a delay register 8.

The delay register 8 (and possibly also other memory fields of the control register 7) may be programmable by a microprocessor 10 via data connection 11, i.e., the microprocessor 10 can perform read/write operations on the delay register 8. The first core 1 may be equipped with a microprocessor interface 15 to communicate via data connection 13 with the microprocessor 10.

I/O of the shared I/O multiplexer 3 is connected to off-chip pins 12. The dashed line 14 indicates the chip boundary of the semiconductor device.

At least two external devices (not shown) may be coupled to the pins 12. The first core 1 implements logic for interfacing to the first external device. The second core 2 implements logic for interfacing to the second external device.

The shared I/O multiplexer 3 is operable to switch the multiplexed interface to the appropriate function operated either by the first core 1 or by the second core 2. The arbiter 6 controls the switching operation of the shared I/O multiplexer 3. More specifically, if the first core 1 operates the first function, the first external device (not shown) is coupled via pins 12 and data link 4 to the first core 1. Otherwise, if the second core 2 operates the second function, the second external device (not shown) is coupled via pins 12 and data link 5 to the second core 2. Moreover, as will be explained in more detail below, the arbiter 6 is adapted to coordinate the operation of the first and second cores 1, 2 during selection/de-selection of external devices.

The first core 1 may be a flash core (also termed EBU (External Bus Unit) core in the art). Such flash core typically supports flash interfaces both for NOR and NAND type flash memories. Flash memories are non-volatile memories that can be electrically erased and reprogrammed. The second core 2 may be an SDRAM controller core supporting an SDRAM interface for an SDRAM external memory device. Specifically, it may support an SDR (Single Data Rate) SDRAM memory device. SDR SDRAM memory devices can accept one command and transfer one word of data per clock cycle. However, SDRAM controller core 2 may also support other SDRAM memory devices, for instance DDR (Double Data Rate) SDRAM memory devices such as DDR SDRAM, DDR2 SDRAM, DDR3 SDRAM etc.

The following detailed description by way of example may consistently apply to a first core 1 which is a flash core supporting flash type external memory devices and a second core 2 which is an SDRAM controller core supporting an SDRAM external memory device. In this case, the flash core 1 implements logic for interfacing to various types of flash memories and the second core 2 implements the controller for an SDRAM. However, it should be understood that the embodiments are not limited to these examples and that the first and second cores 1, 2 may be configured to support external memory devices different from flash and/or SDRAM memory devices.

Figure 2:
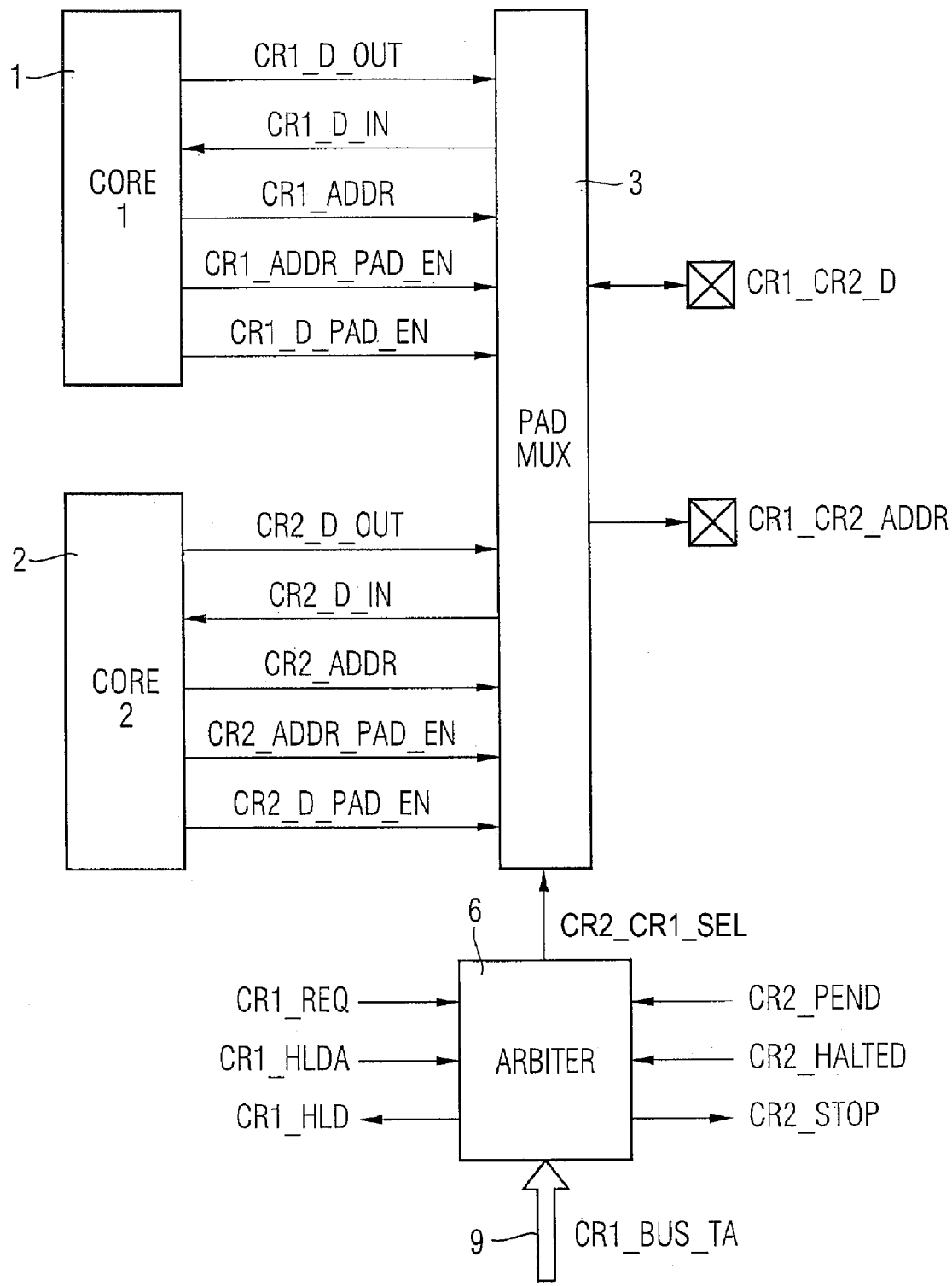
FIG. 2 illustrates a more detailed schematic diagram of the pin multiplexing semiconductor device shown in FIG. 1.

FIG. 2 illustrates signals which are interchanged between the functional blocks 1, 2, 3, 6 of the semiconductor device and used for coordinating the operations thereof. The following signals may be used:

From/to First Core 1
    CR1_D_OUT—data output from first core 1
    CR1_D_IN—data input to first core 1
    CR1_ADDR—address output from first core 1
    CR1_ADDR_PAD_EN—first core address pad enable when first core 1 is selected
    CR1_D_PAD_EN—first core data pad enable when first core 1 is selected.

From/to Second Core 2
    CR2_D_OUT—data output from second core 2
    CR2_D_IN—data input to second core 2
    CR2_ADDR—address output from second core 2
    CR2_ADDR_PAD_EN—second core address pad enable when second core 2 is selected
    CR2_D_PAD_EN—second core data pad enable when second core 2 is selected.

Multiplexed Pads 12
    CR1_CR2_D—multiplexed data from either first core 1 or second core 2
    CR1_CR2_ADDR—multiplexed address from either first core 1 or second core 2.

Arbitration Signals from/to First Core 1
    CR1_REQ—request for external access from first core 1 (0—first core 1 has placed an external access request; 1—no request)
    CR1_HLDA—acknowledge from first core 1 indicating the progress of an external access (0—no external access in progress; 1—external access in progress)
    CR1_HLD—grant/request to first core 1 indicating bus access grant or to release bus (0—request first core 1 to stop an external access; 1—grant to first core 1 to start an external access).

Arbitration Signals from/to Second Core 2
    CR2_PEND—request for external access from second core 2 (0—no request; 1—second core 2 has placed an external access request)
    CR2_HALTED—acknowledge from second core 2 indicating the progress of an external access (0—external access in progress; 1—no external access in progress, second core 2 is halted)
    CR2_STOP—grant/request to second core 2 indicating bus access grant or to release bus (0—grant to second core 2 to start an external access; 1—request second core 2 to stop external access).

Programming Signals to Arbiter
    CR1_BUS_TA—this signal indicates the number of clock cycles required for bus turn-around time.

Control Signal from Arbiter
    CR1_CR2_SEL—this signal is the output of arbiter 6 which is used for selecting second core 2 and first core 1 dynamically.

As may be seen from FIG. 2, the arbiter 6 is operable to generate the signal CR1_CR2_SEL which is used for controlling the multiplexing of address and data signals CR1_CR2_ADDR and CR1_CR2_D of the first core 1 and the second core 2, respectively. Further, not shown in FIG. 2, based on the same CR1_CR2_SEL signal, the arbiter 6 may control data/address pad enables to control the data transfer direction in case of a bi-directional data pad and/or may control disabling data/address pads if only a smaller number of data or address pins are needed to be utilized.

First, the operation of the arbiter 6 is described when the first core 1 needs to perform an external access while the second core 2 is not performing external access or did not place any request to perform external access. In order to request the external access, the first core 1 sets CR1_REQ to 0. As the second core 2 is inactive, the arbiter 6 grants access to the first core 1 by setting CR1_HLD to 1. Now, the first core 1 acknowledges to arbiter 6 that it is now started doing external access by setting CR1_HLDA to 1. Arbiter 6 switches CR1_CR2_SEL to 1 to select first core 1. Further, CR2_STOP is set to 1 to inform second core 2 that first core 1 is now performing an external access.

The steps involved in arbitration when the second core 2 needs to perform an external access when the first core 1 is not performing an external access and did not place any request to perform external access are similar. The second core 2 places its request by setting CR2_PEND to 1. As the first core 1 is inactive, the arbiter 6 grants access to the second core 2 by resetting CR2_STOP to 0. The second core 2 responds with setting CR2_HALTED to 0 when it starts its external access. Arbiter 6 then switches CR1_CR2_SEL to 0 to select second core 2 signals. CR1_HLD is reset to 0 to inform the first core 1 that the second core 2 is now performing an external access.

Various priority schemes may be implemented for the case when the first core 1 and the second core 2 try to initiate external access simultaneously. For instance, the arbiter 6 may grant access based on the last granted master (i.e., external memory device). Last granted master may obtain less priority. Thus if, for example, the first core 1 performed an external access before, it is given lesser priority when the second core 2 requests for an external access. When no other master requests for an external access, the current master may continue to own the access to the pins 12. This is called "last bus parking". Thus, CR1_CR2_SEL is typically only switched on occurrence of a request of a master. However, other possibilities of priority schemes are also available.

If an external access is switched from the first core 1 to the second core 2, slow and/or variable access timings of the first memory device are taken into account. More specifically, the first memory device may have a disable time which has a duration of one or more bus clock cycles. Therefore, there is a time interval over which the first memory device will hold (control) the shared I/O multiplexer 3 even after the first memory device is deselected. This time interval is also called bus turn-around time. The bus turn-around time of first memory devices of different type may vary considerably and may be longer than the bus turn-around time of the second memory device.

Referring to the aforementioned example (first memory device is a flash type memory device), some flash memory devices have a long bus tri-state disable time of a few ns or even tens of ns, whilst other flash type memory devices have shorter disable times. Typically, the disable time of an SDRAM is shorter than the disable time of a flash type memory device. Thus, the bus turn-around times of different flash type memory devices may vary considerably and are typically longer compared to the bus turn-around time of SDRAMs.

Assuming that the second core 2 is granted access to the shared I/O multiplexer 3 before expiry of the bus turn-around time (i.e., at a time when the shared I/O bus is still not cleared), the second core 2 could drive data out right after receiving the grant, and bus contention will occur. Conventionally, such malfunction has often been avoided by reducing the operation frequency of the second core 2 (and thus the clocking rate of the I/O bus) to make the interface associated with the second core 2 to behave the same as the slow interface associated with the first core 1. Note that there is no external wait signal to control the access duration of the second core 2.

In the embodiments described herein, the delay register 8 is used to control the grant timing of the second core 2. To this end, the arbiter 6 receives CR1_BUS_TA via n-bit data connection 9 and reads the bits stored in the delay register 8. The delay register 8 is programmed to store a value substantially equal to the bus turn-around time. In FIG. 1, the bits 00, 01, 10, 11 correspond to a time interval of A, B, C, D clock cycles, respectively. For instance, A=1, B=2, C=3, D=4, or other appropriate clock cycle values for A, B, C, D may be chosen.

Figure 3:
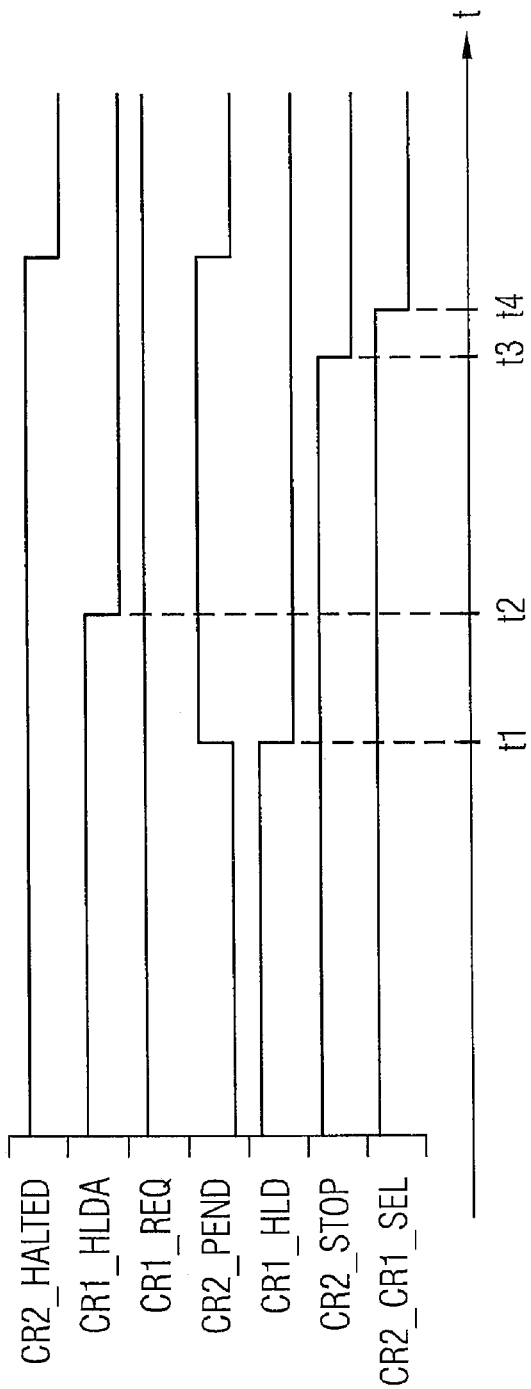
FIG. 3 illustrates a timing chart of signals shown in FIG. 2 when the multiplexed interface switches from a first function to a second function.

In the following, steps involved in arbitration are exemplified for the case when external access is switched from the first core 1 to the second core 2. FIG. 3 illustrates a timing chart of signals CR2_HALTED, CR1_HLDA, CR1_REQ, CR2_PEND, CR1_HLD, CR2_STOP, CR1_CR2_SEL.

Initially, the access is with first core 1. CR1_HLDA, CR1_REQ, CR1_HLD are high. The signal CR1_CR2_SEL is 1. The second core 2 signal CR2_PEND is 0 and the second core 2 signals CR2_STOP and CR2_HALTED are 1. When an access is needed to be performed, CR2_PEND is set to 1 at t1. This causes CR1_HLD to be made 0 instantaneously. After some time first core 1 responds with CR1_HLDA to switch to 0 at t2. Now the second core 2 signal CR2_STOP is made 0 at t3 after expiry of the programmable delay. In other words, the number of clock cycles between t2 and t3 depends on the delay value stored in the delay register 8 (and may, for instance, be equal or an additive contribution thereto). At t4, which may, e.g., be one or more clock cycles after t3, the select signal CR1_CR2_SEL is switched to 0, i.e., goes active to sequence the pad control from the first core 1 to the second core 2. The delay between t3 and t4 helps to ensure proper transfer of the drive state of the pads 12, since the pads 12 typically may drive large loads and thus, some may be needed to charge or discharge these external capacitive loads connected to the pads 12. Once the control of the pads 12 has been given to the second core 2, the second core 2 is then allowed to drive the pads 12. For instance one clock cycle later, it acknowledges progress of external access by setting CR2_HALTED to 0 and termination of request for external access by resetting CR2_PEND to 0.

In other words, the second core 2 is forced to await the bus turn-around time before transmitting data or addresses. Therefore, it is not possible that the I/O bus is still occupied when the interface associated with the second core 2 starts I/O bus access operation. Thus, the interface associated with the second core 2 may operate at maximum speed without the risk of bus contention.

Figure 4:
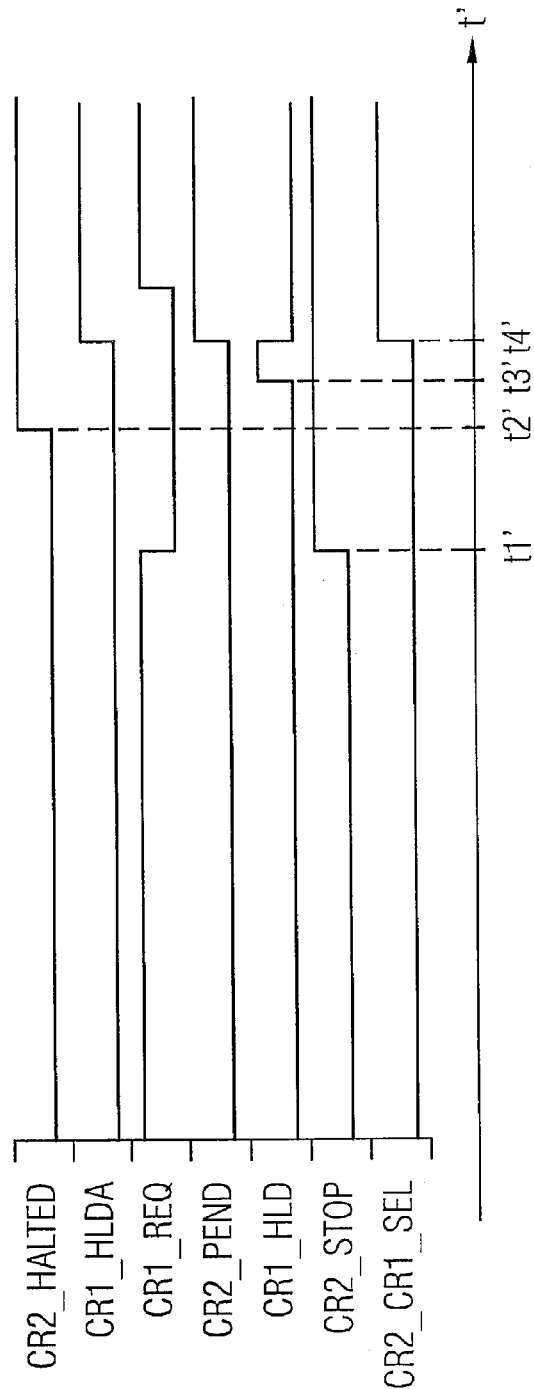
FIG. 4 illustrates a timing chart of signals shown in FIG. 2 when the multiplexed interface switches from a second function to a first function.

In the following, steps involved in arbitration are exemplified for the case when external access is switched from the second core 2 to the first core 1. FIG. 4 illustrates a timing chart of signals CR2_HALTED, CR1_HLDA, CR1_REQ, CR2_PEND, CR1_HLD, CR2_STOP, CR1_CR2_SEL.

Initial access is with second core 2. CR2_HALTED, CR2_PEND and CR2_STOP are 0. CR1_HLDA and CR1_HLD are 0 and CR1_REQ is 1. When the first core 1 wants the access at t1', it makes CR1_REQ to pass to 0 which causes CR2_STOP to become 1. After a delay, second core 2 sets CR2_HALTED to 1 at t2'. This causes CR1_HLD to become 1, one clock cycle later at t3'. After this, another clock cycle later at t4', when the first core 1 sets CR1_HLDA to 1, CR1_CR2_SEL is also made 1.

Reprogramming of the delay register 8 may be accomplished via software control, e.g., by the microprocessor 10 to which the first core 1 is interfaced via interface 15 and data connection 13. Reprogramming may take place each time the semiconductor device (chip) is powered up or each time a new type of first external device (e.g., flash memory) with different bus turn-around time requirements is connected to the pins 12 of the I/O bus. As the first core 1 implements logic configured to interface to different types of first external devices with different access speeds and thus different bus turn-around time requirements, the first core 1 is always informed about the type of first external device connected to the I/O bus. Thus, using this information, the first core 1 may cause the microprocessor 10 to write an appropriate delay value associated with the respective type of first external device into the delay register 8.

On the other hand, it is also possible to use a constant default value for the delay value stored in the delay register 8. Such constant delay value should be equal or larger than the maximum bus turn-around time to be expected. For instance, the maximum of the bus turn-around times of the different types of first external devices supported by the first core 1 could be used as the default delay value. In this case, the delay register 8 must not be programmable.

What is claimed is:

1. A semiconductor device coupled to input/output pins, the semiconductor device comprising:
   a first core to operate a first function;
   a second core to operate a second function;
   a multiplexer arranged to set the input/output pins according to the first function or to the second function;
   an arbiter arranged to receive requests from the first and second cores to use the input/output pins and to grant use of the input/output pins to a selected core; and
   a register arranged to store a delay value indicative of one of a plurality of delay settings to be applied by the arbiter when granting use of the input/output pins to the second core, wherein each of the plurality of delay settings comprises a different number of clock cycle delays.

2. The semiconductor device of claim 1, wherein the register comprises a programmable register.

3. The semiconductor device of claim 2, further comprising a control unit configured to program the register.

4. The semiconductor device of claim 3, wherein the control unit is configured to program the register dependent on a type of external device operated by the first core.

5. The semiconductor device of claim 3, wherein the first core is associated with an interface through which the control unit accesses the register.

6. The semiconductor device of claim 1, wherein the arbiter is further arranged to receive an access status from the first core indicating whether or not the first core progresses an external access via the input/output pins.

7. The semiconductor device of claim 6, wherein the arbiter is arranged to apply the one of the plurality of delay settings in between a time when it receives the access status from the first core indicating that access has been completed and a time when it grants use of the input/output pins to the second core.

8. The semiconductor device of claim 1, wherein the first core is configured to support a plurality of external devices with different access speeds.

9. The semiconductor device of claim 1, wherein the first core is configured to support one or more external devices of flash memory type.

10. The semiconductor device of claim 9, wherein the second core is configured to support a synchronous dynamic random access memory as an external device.

11. The semiconductor device of claim 10, wherein the second core comprises a single data rate interface controller.

12. A method for multiplexing across a plurality of input/output pins between a first core to operate a first function and a second core to operate a second function, the method comprising:

sending a request signal from the second core to an arbiter for use of the input/output pins;

commanding the first core to stop external access via the input/output pins; and granting use of the input/output pins to the second core under control of one of a plurality of predetermined delay settings, each predetermined delay setting corresponding to a different number of clock cycle delays.

13. The method of claim 12, wherein the predetermined delay setting comprises a programmable delay setting.

14. The method of claim 12, further comprising programming the predetermined delay setting, wherein the delay is dependent on a type of external device operated by the first core.

15. The method of claim 13, further comprising programming the predetermined delay setting by writing a value indicative of the predetermined delay setting into a register.

16. The method of claim 12, further comprising sending an access status from the first core, the access status indicating whether or not the first core progresses an external access via the input/output pins to the arbiter.

17. The method of claim 16, further comprising inserting a clock cycle delay between a time when the arbiter receives the access status from the first core indicating that access has been completed and a time when the arbiter grants use of the input/output pins to the second core.

18. The method of claim 12, wherein commanding the first core to stop external access comprises the arbiter commanding the first core to stop external access.

19. The method of claim 18, wherein granting the use of the input/output pins to the second core comprises the arbiter granting use of the input/output pins to the second core.

* * * * *